(12) United States Patent
Zhang (10) Patent No.: US 12,200,571 B2
(45) Date of Patent: Jan. 14, 2025

(54) TERRESTRIAL POSITIONING SYSTEM

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 801 days.

(21) Appl. No.: 17/170,560

(22) Filed: Feb. 8, 2021

(65) Prior Publication Data
US 2021/0258731 A1    Aug. 19, 2021

Related U.S. Application Data

(60) Provisional application No. 62/976,937, filed on Feb. 14, 2020.

(51) Int. Cl.
| | | |
|---|---|---|
| *H04W 4/02* | (2018.01) | |
| *H04L 12/18* | (2006.01) | |
| *H04W 4/029* | (2018.01) | |
| *H04W 4/06* | (2009.01) | |

(Continued)

(52) U.S. Cl.
CPC ........... *H04W 4/029* (2018.02); *H04L 12/189* (2013.01); *H04W 4/06* (2013.01); *H04W 60/02* (2013.01); *H04W 72/30* (2023.01)

(58) Field of Classification Search
None
See application file for complete search history.

(56) References Cited

U.S. PATENT DOCUMENTS

| | | |
|---|---|---|
| 9,646,496 B1 | 5/2017 | Miller |
| 2001/0034239 A1 | 10/2001 | Yamato et al. |
| 2002/0025824 A1 | 2/2002 | Lin |

(Continued)

FOREIGN PATENT DOCUMENTS

| | | |
|---|---|---|
| CN | 101239626 A | 8/2008 |
| CN | 102098778 A | 6/2011 |

(Continued)

OTHER PUBLICATIONS

3GPP TS 38.305, V15.4.0, 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, 72 pages.

(Continued)

*Primary Examiner* — Willie J Daniel, Jr.

(57) ABSTRACT

A method and apparatus for estimating a location using a network function. In the method, at least one positioning apparatus registers to a management function by sending a registration message and transmit a location information message containing an indication of geographic location of said positioning apparatus; the management function gets the at least one positioning apparatus registered according to the received registration message, and sends a response message including information associated with a transmission of the location information message to the at least one positioning apparatus. The location information message is transmitted by the at least one positioning apparatus to a mobile device according to the information included in the response message.

17 Claims, 7 Drawing Sheets

(51) Int. Cl.
*H04W 60/02* (2009.01)
*H04W 72/30* (2023.01)

(56) References Cited

U.S. PATENT DOCUMENTS

| | | | |
|---|---|---|---|
| 2004/0198386 A1 | 10/2004 | Dupray | |
| 2008/0064380 A1 | 3/2008 | Niemenmaa et al. | |
| 2008/0242374 A1 | 10/2008 | Alexander | |
| 2008/0261612 A1 | 10/2008 | Mia et al. | |
| 2011/0060807 A1 | 3/2011 | Martin et al. | |
| 2012/0154286 A1 | 6/2012 | Lim et al. | |
| 2012/0315903 A1 | 12/2012 | Yoshimura et al. | |
| 2015/0226577 A1 | 8/2015 | Le Grand et al. | |
| 2016/0307442 A1 | 10/2016 | Relyea et al. | |
| 2017/0371337 A1 | 12/2017 | Ramasamy | |
| 2018/0089994 A1 | 3/2018 | Dhondse et al. | |
| 2018/0247138 A1 | 8/2018 | Kang | |
| 2018/0262903 A1 | 9/2018 | Ryan et al. | |
| 2019/0035280 A1 | 1/2019 | Kim et al. | |
| 2019/0078897 A1 | 3/2019 | Sumizawa | |
| 2019/0384293 A1 | 12/2019 | Yoo | |
| 2020/0296680 A1* | 9/2020 | Akkarakaran | H04W 4/029 |
| 2020/0410260 A1 | 12/2020 | Choe | |
| 2021/0018916 A1 | 1/2021 | Thakur | |
| 2021/0120517 A1* | 4/2021 | Akkarakaran | G01S 5/02213 |
| 2021/0160810 A1 | 5/2021 | Zhang et al. | |
| 2021/0250732 A1* | 8/2021 | Zhang | H04W 4/023 |
| 2021/0407290 A1 | 12/2021 | Oba | |
| 2022/0013008 A1 | 1/2022 | Katz et al. | |

FOREIGN PATENT DOCUMENTS

| | | |
|---|---|---|
| CN | 104244404 A | 12/2014 |
| CN | 104796865 A | 7/2015 |
| CN | 106646573 A | 5/2017 |
| CN | 107121980 A | 9/2017 |
| CN | 107222894 A | 9/2017 |
| CN | 109451580 A | 3/2019 |
| CN | 109813332 A | 5/2019 |
| CN | 109842934 A | 6/2019 |
| EP | 3190426 A1 | 7/2017 |
| EP | 3240311 A1 | 11/2017 |
| EP | 3352486 A1 | 7/2018 |
| JP | 2002518684 A | 6/2002 |
| JP | 2018197964 A | 12/2018 |
| KR | 20050017046 A | 2/2005 |
| WO | 2012099828 A1 | 7/2012 |
| WO | 2019027245 A1 | 2/2019 |

OTHER PUBLICATIONS

3GPP TS 23.273 V16.1.0, 3rd Generation Partnership Project; Technical Specification Group Services and System Aspects; 5G System (5GS) Location Services (LCS); Stage 2(Release 16), Sep. 2019, 90 pages.

N4: "Clarifications on GSM vs. UMTS specific parts",3GPP Draft; 23007-005, 3rd Generation Partnershipproject (3GPP), Mobile Competence Centre;650,Route Des Lucioles;F-06921 Sophia-Antipolis Cedex France,vol. TSG CN, No. Dusseldorf, Germany; Jul. 19, 2000, Jul. 19, 2000(Jul. 19, 2000), XP050047730, total:7pages.

R3: "Correction to LMU Information Signaling", 3GPP Draft; R3 122308, 3rd Generation Partnership Project (3GPP), Mobile Competence Centre;650,Route Des Lucioles;F-06921 Sophia-Antipolis Cedex France vol. RAN WG3 Sep. 29, 2012 (Sep. 29, 2012), XP050670136, total:6pages.

* cited by examiner

210 Positioning Apparatus

230 Mobile Device

310 Receive operating parameters

320 Receive the location information message on wireless resources using operating parameters

TERRESTRIAL POSITIONING SYSTEM

CROSS-REFERENCE TO RELATED APPLICATIONS

This application claims benefit of priority to U.S. Provisional Patent Application Ser. No. 62/976,937 entitled "Terrestrial Positioning System" filed Feb. 14, 2020 the contents of which are hereby incorporated by reference in their entirety.

FIELD OF THE INVENTION

The present invention pertains to geographic positioning and in particular to a method and apparatus for estimating a location using a network function.

BACKGROUND

In future networks, location based techniques will potentially be very important techniques for wireless communications. Location based wireless control and management have been proposed, including location based user equipment (UE) operation optimization and location based resource management in vehicle-to-everything (V2X). These location based technologies require control/management MAPs and also require location information to be available at wireless network entities, such as, devices, cells, access points, or the like.

Currently, entities can acquire their location information using the global positioning system (GPS). A GPS receiver can acquire their location, in terms of absolute geographic location, in the form of latitude and longitude (a two-dimensional system) from the GPS satellite system. However, a common issue with the GPS solution is that GPS signals are not always available everywhere. For example GPS signals may not be available in indoor settings or along streets in an urban area. Another common issue with the GPS solution is that the two-dimensional system can make positioning devices in an urban city's multi-layer overpasses a challenge. Also, the power consumption required by a device employing GPS to determine its location is a concern for battery limited devices.

Both the $3^{rd}$ Generation Partnership Project (3GPP) positioning techniques and Wi-Fi based techniques are alternatives to the GPS positioning technique solution. However, some 3GPP and Wi-Fi based techniques can only be used by network or access points to locate devices and cannot be used by devices to obtain their own location. Fortunately some 3GPP and Wi-Fi positioning systems can provide information to mobile devices so that these mobile devices can locally estimate their location. However, the accuracy attainable by mobile devices using this information provided by these 3GPP and Wi-Fi positioning system is limited because the positioning information is only provided at the cell/access point level.

Therefore, there is a need for a more efficient, ubiquitous and reliable positioning system that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for determining a location of a mobile device. The method, apparatus and system may include multiple communicating components. Coordination of components may be carried out using communication via an access network (AN) node of a wireless network. Components may include a management function, one or more positioning apparatuses, one or more mobile devices, and one or more AN nodes of a wireless network.

In accordance with a first embodiment of the present invention, there is provided a system comprising at least one positioning apparatus where each positioning apparatus is configured to register to a management function by sending a registration message and transmit a location information message containing an indication of geographic location of the positioning apparatus. This system also comprises a management function that is configured to register at least one positioning apparatus according to the received registration message and send a response message including information associated with a transmission of the location information message to this positioning apparatus. This location information message is transmitted by the positioning apparatus to a mobile device according to the information included in the response message. A technical effect is that a terrestrial positioning system can be deployed, and the deployment can be managed and configured by a management function.

In accordance with a second embodiment of the present invention, there is provided a positioning apparatus comprising a processor, memory, and communication interface configured to transmit a location information message containing an indication of geographic location of the positioning apparatus. This positioning apparatus also interacts, via the wireless communication interface, with a management function to register the positioning apparatus to a system and to manage operation of the positioning apparatus. A technical effect is that deployment and configuration of the positioning apparatus is managed by a management function, which can direct operation of the positioning apparatus.

In accordance with a third embodiment of the present invention, there is provided a method including at least one positioning apparatus that registers to a management function by sending a registration message and also transmits a location information message containing an indication of geographic location of the positioning apparatus. This method also includes a management function for registering this positioning apparatus according to the received registration message and sends a response message including information associated with a transmission of the location information message to this positioning apparatus where the location information message is transmitted by this positioning apparatus to a mobile device according to the information included in the response message. This method further includes the positioning apparatus transmitting the location information message containing the indication of geographic location of the positioning apparatus on a specific resource according to the available resource indicated in the response message. The positioning apparatus selects a specific resource for transmission of the location information from this available resource. A technical effect is that a terrestrial positioning system can be deployed, and the deployment can be managed and configured by a management function.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide for a method and apparatus for providing location information messages for use by mobile devices in determining their location. The mobile device is communicatively coupled to a wireless communication network, also referred to as a wireless network or wireless access network, and the mobile device uses radio access nodes (AN nodes) of the wireless communication network for communication purposes. In addition, a set of positioning apparatuses (for example referred to as terrain positioning system (TPS) point devices) repeatedly wirelessly transmit location information messages, which are used by the mobile device to determine their geographic location. The positioning apparatuses may be operatively coupled to an AN node of the wireless network. The positioning apparatuses are operatively coupled to a controller, for example via the AN node, and the mobile device can register with and interact with the controller, for example via the AN node. Therefore, in some embodiments, the AN node is used as a communication relay, to facilitate operation of a location service for mobile devices. Accordingly, due the registration and use of a management function, the system can be coordinated and established across a geographic area for example using the network. Registration with the service allows access to the service to be managed, and potentially monetized.

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention provide a system, which may be an independent infrastructure network deployed by a provider separate from the wireless access network provider. Alternatively, the system may be deployed by the wireless access network provider. The system may utilize the wireless access network to facilitate operation. The system includes at least a TPS management function (also referred to as a controller) and a plurality of positioning apparatuses. The positioning apparatuses may be physically separate from other parts of the wireless network and substantially dedicated only to transmitting signals for supporting the geographic location service. The positioning apparatuses are separate from the wireless network, resulting in a more flexible infrastructure.

The location information message, in the form of physical layer codes/sequences or L2 messages, transmitted by a given positioning apparatus include an indication of the geographic location of that positioning apparatus. In addition, the location information message can include other relevant information such as a time stamp indicative of a precise time of transmission of the signal. Based on location information messages received from multiple positioning apparatuses, the mobile device is configured to determine its location. Various techniques can be used for location determination, for example triangulation, trilateration, multilateration, time-of-arrival processing, time-difference-of-arrival processing, angle-of-arrival processing, etc. In some embodiments, a multilateration technique similar to that used in global positioning (GPS) systems can be used. Physical layer detection information can be used to facilitate these techniques. As will described below, the actual location determination can be based solely on the signals carrying the location information, or based on these signals in addition to other physical signals transmitted by the transmission point.

In some embodiments, the location information message includes an indication of geographic location of a corresponding one of the positioning apparatuses, along with an associated identifier. Based on such location information messages, the mobile device determines the location of a set of positioning apparatuses within communication range. The mobile device can then determine its distance from these positioning apparatuses, or the direction toward these positioning apparatuses, or a combination thereof, by monitoring and processing signals transmitted by the positioning apparatuses. These signals can include the location information messages or other, separate transmissions by the positioning apparatuses. For example, signals can be processed to determine the direction of origin, the time delay between transmission and reception (and thus the distance traveled), or both. This information can be used for triangulation or multilateration by the mobile device for location determination, based on the known locations of the positioning apparatuses transmitting the signals. The location information message can inform mobile devices of the location of a positioning apparatus, so that the mobile device can determine its absolute location, in addition to its relative distance or position with respect to one or more positioning apparatuses.

The positioning apparatuses can be distributed in a given environment, such as an urban environment or roadway. By determining their distance from (or relative angular location relative to) multiple positioning apparatuses, mobile devices can be configured to determine their location based on the signals from the positioning apparatuses as mentioned above. This location can be a three-dimensional location in scenarios where the height of the mobile device is variable, for example in a building or complex environment with overlapping paths.

To enable location based techniques to be applied in a variety of services, for example, smart city, Industry 4.0 and so on, an efficient, reliable and ubiquitous positioning system should be considered in order for wireless devices to locally obtain their location information with certain accuracy.

According to embodiments of the present invention, a Terrain Positioning System (TPS) is described for devices to obtain their location from dedicated positioning apparatuses, referred to for example as positioning apparatuses. These positioning apparatuses are included in a dedicated TPS network. Embodiments of the present invention also provide for particular control and management messages.

The positioning apparatuses can transmit signals usable by mobile devices to determine their location via triangulation or multilateration. These signals can be integrated with the location information messages, or transmitted separately.

The mobile device receives at least some of the location information messages and determines the location of the mobile device based at least in part on content of the location information messages. The location may be determined based on physical layer parameters of the signal integrated with the location information message or transmitted separately. The parameters may include, for example, direction of arrival, signal strength, time of flight, etc. Time of flight can be detected using clock synchronization, detection of waveforms in the signal, and determining when the detected waveforms arrive at the mobile device relative to when they were transmitted, according to a predetermined schedule. Physical layer parameters may include patterns in signals that can be used to detect time of arrival, and thus time of flight, of the signals, similarly to the operation of GPS positioning signals, or other location determination methods involving triangulation or trilateration.

In various embodiments, the TPS includes a TPS management function and positioning apparatuses deployed at selected geographic locations. The positioning apparatuses can transmit using wireless resources belonging to a TPS resource pool. A set of TPS messages are provided for supporting operation of the TPS.

The TPS resource pool includes a set of physical layer resource units, also referred to as wireless resources. A physical layer resource unit can be, for example, a combination of frequency band, sub-carriers, time slots, and codes. The resource pool size should be carefully designed to allow efficient device positioning to ensure optimal positioning accuracy. For example, efficient device positioning can be facilitated by enabling a small device search space.

A positioning apparatus can be assigned a single TPS resource unit or a set of TPS resource units. Also, resource units in a pool can be reused among positioning apparatuses. For example, positioning apparatuses within a predetermined proximity of one another may use different resource units, and at least two of the positioning apparatuses outside of the predetermined proximity of one another may use a same resource unit. This allows more efficient use of wireless resources, because each positioning apparatus transmission is only received in a limited coverage area. By using a resource pool, transmission resources can be confined to a suitable region. By having positioning apparatuses autonomously select resources from a pool, resource assignment can be simplified.

Different members of two or more positioning apparatuses may re-use one or more resources from a pool of wireless resources. Said positioning apparatuses may be sufficiently spaced apart so that mutual interference that may result from said re-use may be below the level required for reliable reception of respective location information messages that may be transmitted by each of said positioning apparatuses. That is, resources used by different positioning apparatuses can be spatially re-used. This reduces the total number of resources used for location information messages, and may reduce the burden of mobile devices to search for location information messages.

The physical layer design of a system can be, for example, similar to the physical layer design of a GPS. However, unlike GPS, codes can be reused in a system.

In various embodiments, the TPS management function is responsible for managing deployment of positioning apparatuses and for managing the TPS resource unit pool and assignment of resources therefrom. The management function may also manage several aspects of the system, including managing positioning apparatus registration and on-line positioning apparatus resource configuration, TPS encryption key management, and management of TPS subscriber (mobile device) registration.

The TPS management function may also interact with an access network (AN) node of a wireless access network to enable operation of the system. This includes, for example, informing the wireless access network management entity regarding the TPS resource pool, valid area, valid time window of the resource unit pool, and positioning apparatus deployment of the system topology. The TPS management function may also interact with the access network for positioning apparatus management and TPS subscriber management.

The AN node may be responsible for supporting the TPS network receiving information from the system including valid area and valid time window. The AN node may also support the positioning apparatus operation. This may involve relaying interactions between the TPS management function and positioning apparatuses for initial registration of the positioning apparatuses, authentication and authorization of positioning apparatuses, supporting subscribers of TPS devices, relaying interactions between the system and TPS subscribers for subscriber registration, and key management.

Although an AN node and wireless network are described herein with respect to various embodiments, it should be noted that some embodiments of the present invention may utilize an AN node, while others may not necessarily use an AN node. When the AN node is present, it may mediate communication in the uplink direction, from the mobile device (or TPS point) to the management function. Additionally or alternatively, the AN node may mediate communication in the downlink direction, from the management function of the location service to the mobile device (or TPS point) subscribing to the location service. Said communication can include at least one of: transmitting a registration request from the mobile device to the management function or informing the mobile device of information associated with how to receive the location service. For the AN node, the information associated with how to receive the location service includes resources used for transmission of the location information message and one or more security keys for decrypting the location information message. Alternatively, the management function and the mobile device (or TPS point) may communicate directly without using an AN node, when the management function is equipped with the necessary communication hardware. When the AN node is involved, the AN node may simply relay messages between the mobile device and the management function without processing content of the messages. In some embodiments, the AN node may add information to the messages.

Figure 1:
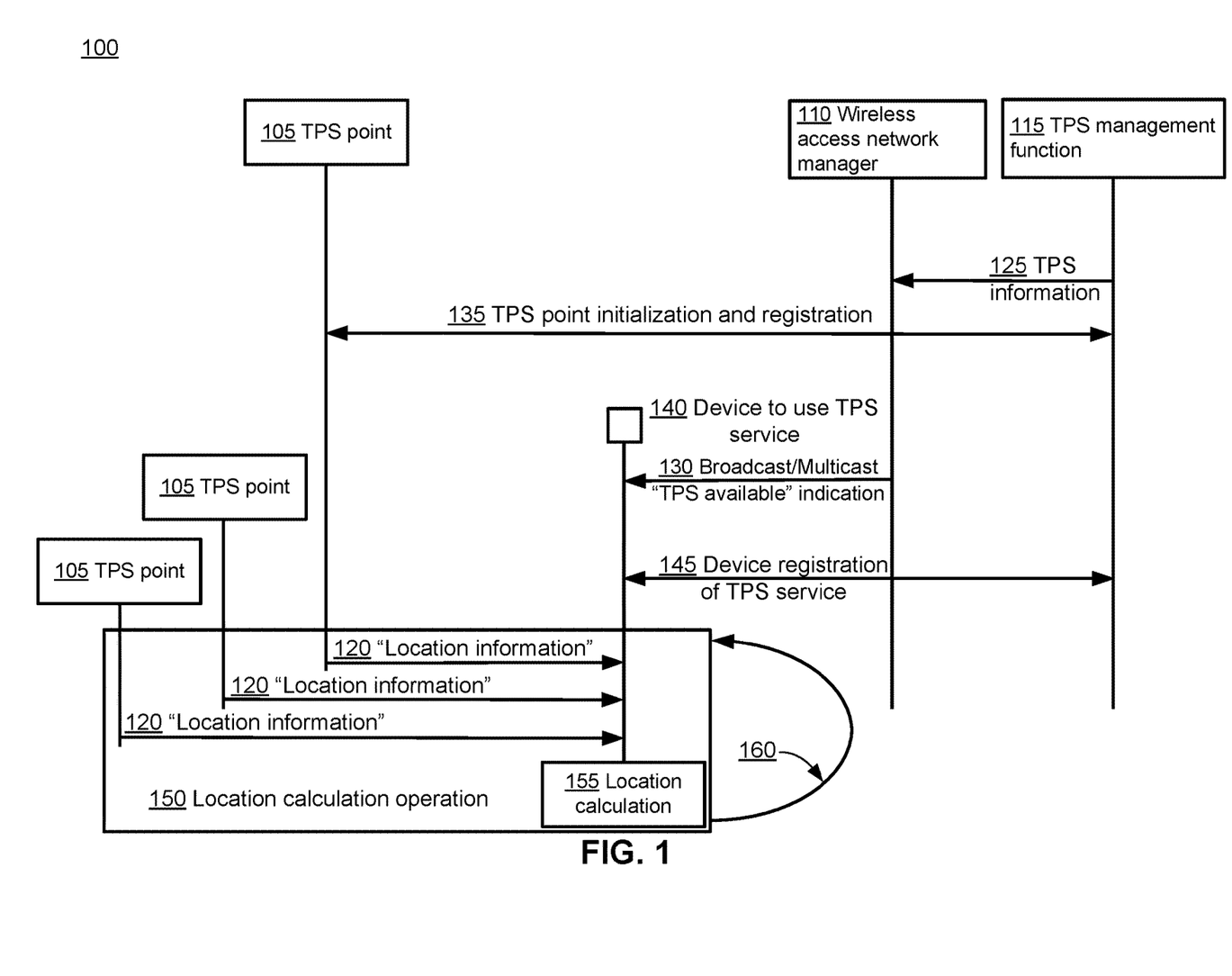
FIG. 1 illustrates an operation by which location may be estimated, according to embodiments of the present invention.

Referring now to FIG. 1, system 100 is depicted. The system 100 contains a plurality of positioning apparatuses 105, which may be the same as location reference points of the system 100. A wireless access network manager 110 (which may be part of or separate from an AN node) is depicted, and receives TPS information 125 from a TPS management function 115. The wireless access network manager, at step 130, broadcasts or multicasts a "TPS available" indication. This facilitates mobile devices in accessing the service. At step 135, the wireless access network manager 110 and TPS management function 115, using a positioning apparatus 105, begin positioning apparatus initialization, registration, and authentication. The TPS management function and positioning apparatus further interact to exchange information such as resource units pool information, resource assignment information and key material information. This information is used for transmission of the "Location Information" 120 message, from the positioning apparatus 105 to the mobile device 140. The mobile device then performs a location calculation 155 based at least in part on contents of the location information messages from one or more positioning apparatuses. A device 140 that is to use TPS service can, via step 145, be registered with the TPS service. The registration step 145 may include authentication and authorization, the acquisition of system key materials, and the acquisition of TPS resource units pool information.

A positioning apparatus can receive TPS resource pool information and/or wireless resource assignment for TPS operation from a management function or from an AN node of a wireless access network. A positioning apparatus can also select one TPS resource unit or a set of TPS resource units. The TPS resource pool is a pool of wireless resources which are usable by positioning apparatuses in a given area, during a given time interval, or both, to transmit "location information" messages and possibly also other signals. A positioning apparatus can autonomously select a particular wireless resource from the pool, and inform the TPS management function of the selection. Alternatively, a positioning apparatus can receive an instruction form the TPS management function indicating which resource unit to use. The indication of the resource pool can be received in a message. The resource pool can include multiple resources units. In one embodiment, each resource unit is sufficient for the transmission requirements of a particular positioning apparatus. In one embodiment, a positioning apparatus may select and use multiple resource units. In one embodiment, once a resource unit is selected from the pool, the positioning apparatus informs the management function of the selected resource, so that this resource is not used by other nearby positioning apparatuses. The management function may also store an indication of the resource units currently being used and an identity of the positioning apparatus using each such resource unit. This may assist with resource assignment (with spatial reuse) and resource reassignment.

A positioning apparatus can register with the TPS management function prior to its operation. The management function may also be configured to authenticate and authorize the positioning apparatus during registration. A positioning apparatus can register by sending a positioning apparatus registration message to the system (e.g. to the management function), for example via an AN node. During this operation, a positioning apparatus can obtain all related operation configuration information. If the TPS resource assignment is set as "autonomous" the positioning apparatus should perform autonomous TPS resource selection, by for example, monitoring all TPS resource units and then selecting one or more units based on the result of this monitoring. The registration message may indicate an identifier of the positioning apparatus sending the registration message and an identifier of a location determination system which the positioning apparatus is registering to operate as part of.

The management function can register the positioning apparatus according to the received registration message received via an access network (AN) node and can also send a response message to the positioning apparatus. The registration message and the response message can be transmitted between the positioning apparatus and the management function via an access network (AN) node. The access network (AN) node may broadcast or multicast, to mobile devices, an indication of availability of a location service associated with one or more of: the management function or the at least one positioning apparatus that can be responsible for providing the location service. The indication can be included in a system information block (SIB). The AN node can mediate the interaction between the management function and the mobile device. The registration message can include an identifier of the positioning apparatus sending the registration message. This response message can include information associated with transmission of the location information message. The response message can include an indication of resources available for transmission of the location information message. The response message can include an indication of a security key for transmission of the location information message. The available resource indicated in the response message can be the specific resource assigned to the positioning apparatus for transmission of the location information. A technical effect is that the deployment of the positioning apparatus can be managed by the management function.

The geographic location of said positioning apparatus is a relative location or an absolute geographic location. A location information message can indicate whether the geographic location is a relative location or an absolute geographic location.

In some embodiments, there are a plurality of positioning apparatuses, and location information messages from different positioning apparatuses which are located within a predetermined area use different portions of a pool of wireless resources. Location information messages from different positioning apparatuses which are not located within a predetermined area occupy a same portion of the pool of wireless resources. Spatial resource reuse is thereby implemented.

In various embodiments, particularly where spatial resource reuse is implemented, the management function can be configured to assign at least some of the plurality of positioning apparatuses with respective portions of the wireless resources, or at least some of the positioning apparatuses can autonomously determine their respective portions of the wireless resources, or a combination thereof.

In some embodiments, the management function can receive from the mobile device, a request for a registration to a location service via the AN node and after getting the mobile device registered and inform the mobile device of information indicating how to receive the location information message.

In some embodiments, the mobile device can receive the location information message on a resource indicated to the mobile device by the management function or the AN node and the mobile device can determine its location based at least in part on content of the location information message.

The mobile device can transmit a registration message to the management function or to a management entity. The mobile device can also receive from the management function or the management entity, a response including information indicating a resource associated with the location information message. The mobile device can also receive the location information message on the indicated resource. The indicated resource can include a pool of wireless resources on which the location information message can be broadcast from the at least one positioning apparatus, and the response can further indicate at least one of a region in which the location information message can be transmitted on the indicated resource, and can include a time interval during which the location information message is transmitted on the indicated resource.

The management function, based on the registration message can authenticate the mobile device and authorize the mobile device to access the location information messages, or a combination thereof. The management function can also send the response to the mobile device following successful authentication of the mobile device and authorize the mobile device or the combination thereof.

The location of the mobile device can be further determined, by the mobile device, based on physical layer parameters of signals received from the at least one positioning apparatus.

The mobile device can receive security information for decrypting the location information message. The mobile device can, according to the indication, send the registration request, and receive an indication of availability of a location service associated with one or more of the management function or the at least one positioning apparatus. After receiving the indication of availability of a location service, the mobile device can send a registration request according to the indication.

Each positioning apparatus can periodically transmit time domain "location information" messages using the TPS resource selected or assigned for that TPS point. Location information messages can be transmitted to a mobile device according to information included in the response message received from the management function.

A TPS device (mobile device) can register with a system by transmitting a "TPS subscriber registration" message to a system, for example via an AN node. This system can be a management function or a management entity. The management function can be further configured to, based on the registration message, to authenticate the mobile device, authorize the mobile device for accessing the location information messages, or a combination thereof. This management function may also send the response to the mobile device following successful authentication of the mobile device, authorizing of the mobile device or the combination thereof. This mobile device is informed, after it has been successfully registered with a TPS resource pool for example via an AN node. The mobile device can receive a location information message from the management function or AN node on resources indicated to the mobile device by the management function or the AN node. The mobile device can be informed that it has been registered by receiving a response from the management function or management entity and this response can include an indication of a resource associated with the location information message and receive the location information message on the indicated resources. The indicated resources can include a pool of wireless resources on which the location information message can be broadcast from the at least one positioning apparatus and the response can indicate at least one region in which the location information message can be transmitted on the indicated resource and a time interval during which the location information message can be transmitted on the indicated resource. A technical effect is that the mobile device can register with a system that can be managed by a management function or a management entity.

The management function can also receive a request for registration to a location service from the mobile device after the mobile device is registered. This request can be received via an AN node. The mobile device can be sent (e.g. by the management function) information indicating how to receive the location information message. The information indicating how to receive the location information message can include one or both of: resources used for transmission of the location information message and one or more security keys for decrypting the location information message. The request for the registration can include an identifier of the mobile device or an identifier of a subscriber associated with the mobile device.

An AN node can be configured to broadcast or multicast an indication of location service availability to one or more mobile devices. These location services can be associated with one or more management functions or positioning apparatuses. The indication of location service availability can be included in a system information block (SIB).

A TPS device (mobile device) can locally calculate its location using TPS signals and messages detected as a result of monitoring all resource units in a TPS resource pool. The mobile device may also determine its location based on physical layer parameters of signals received from a positioning device. These TPS signals include but are not necessarily limited to the location information messages broadcast or multicast by the positioning apparatuses.

A Location Information message can include a single bit indicating the type of location. This location type can be either absolute location or relative location. When the location description type is absolute, the location information may include latitude, longitude and height of the transmission point. On the other hand, if the location description type is relative, the location information may include relative location of the transmission point. The relative location of the transmission point may be represented in terms of coordinates on an x, y and z axis, with some predetermined, commonly known origin or zero point.

The location information message may carry a list of location information. The list of location information may include one or more of: absolute location information (e.g. latitude, longitude, height); relative location information with respect to a fixed location or place, or other information indicative of geographic location of transmission points. Each instance of the location information may correspond to a transmission point identified by a corresponding transmission point identifier in the location information message. The list of location information may include location information for transmission points in a certain limited area. The location information may include other information indicative of location of the transmission points. For instance, the location information may include information indicative of the location of the transmission point location in other format. The location information message may also include an identifier of the positioning apparatus. This positioning apparatus may be on a specific resource that was one of the available resources included in the response message. In some embodiments, the available resource indicated in the response message can be the specific resource assigned to the positioning apparatus for transmission of the location information.

The positioning apparatus registration message can include the system ID and positioning apparatus ID. The positioning apparatus may send the registration message via the AN node to register itself to a particular system.

In some embodiments, a method is provided in which a positioning apparatus transmits a location information message that can contain an indication of geographic location of said positioning apparatus. The method can also include registering, via the communication interface, to a management function responsible for management of a location service. The method can also include receiving, via the communication interface, information on how to transmit an indication of geographic location of said positioning apparatus after the registration. The method can include transmitting a location information message that can contain the indication of geographic location of said positioning apparatus according the received information. A technical effect is that a positioning apparatus can register to a management function responsible for management of a location service. This registration can include the geographic location of the positioning apparatus.

The received information can include a resource assigned for a transmission of the indication and the method can include transmitting the location information message on the resource. The received information can include available resources for a transmission of the indication and the method can include selecting a resource from the available resources and transmitting the indication on the selected resource.

Registering to the management function can comprise getting successful authentication and authorization with the management function.

The geographic location of the positioning apparatus can be a relative location or an absolute geographic location and the location information message can indicate whether the geographic location is a relative location or an absolute geographic location.

The received information can further include a security key for encrypting the location information message, and the method can further comprise transmitting the location information message encrypted with the security key.

In some embodiments, as mentioned above, an AN can broadcast or multicast an indication of availability of a location service associated with at least one positioning apparatus, a management function, or both. Such embodiments can include mediating interaction between a management function of the location service and a mobile device subscribing to the location service. Said interaction can include at least one of transmitting a registration request from the mobile device to the management function or informing the mobile device of information associated with how to receive the location service. The information associated with how to receive the location service can include resources used for transmission of the location information message and one or more security keys for decrypting the location information message. A technical effect is that the interaction between the management function of a location service and a mobile device can be supported by the access node, which may be part of an existing communication network.

In some embodiments, the positioning apparatus registration complete message can include a single bit indicating the type of resource assignment. In some embodiments, the response message can include a single bit indicating the type of resource assignment. In these embodiments, when the resource assignment bit is set, autonomous mode is selected. In this case the positioning apparatus is configured to respond by selecting its own resource for use in transmitting location information messages and other signals. In this case, the TPS resource unit pool from which the selection of resource is to be made can be specified in the registration complete message or in an associated message from the management function, for example the response message. When the resource assignment bit is not set, the resource assigned for use by the positioning apparatus can be specified in the registration complete message or in an associate message from the management function, for example the response message. In this case, the positioning apparatus does not select its own resource. A positioning apparatus registration complete message can also include the TPS key materials information. A technical effect is that a response message can indicate if the positioning apparatus is configured to select its own resources.

Accordingly, the registration complete message may include an indication that the positioning apparatus is to perform its own assignment of wireless resources from a pool. The wireless resources are to be used by the positioning apparatus to repeatedly transmit a location information messages. The registration complete message in such a case further includes an indication of the pool of wireless resources. In other cases, the registration complete message includes an indication that the positioning apparatus is to receive an assignment of said wireless resources from a controller, along with this indication of assignment of wireless resources.

The TPS subscriber registration message can include the subscriber ID information.

The TPS subscriber registration complete message can include the TPS resource unit pool information and key materials information.

Figure 2:
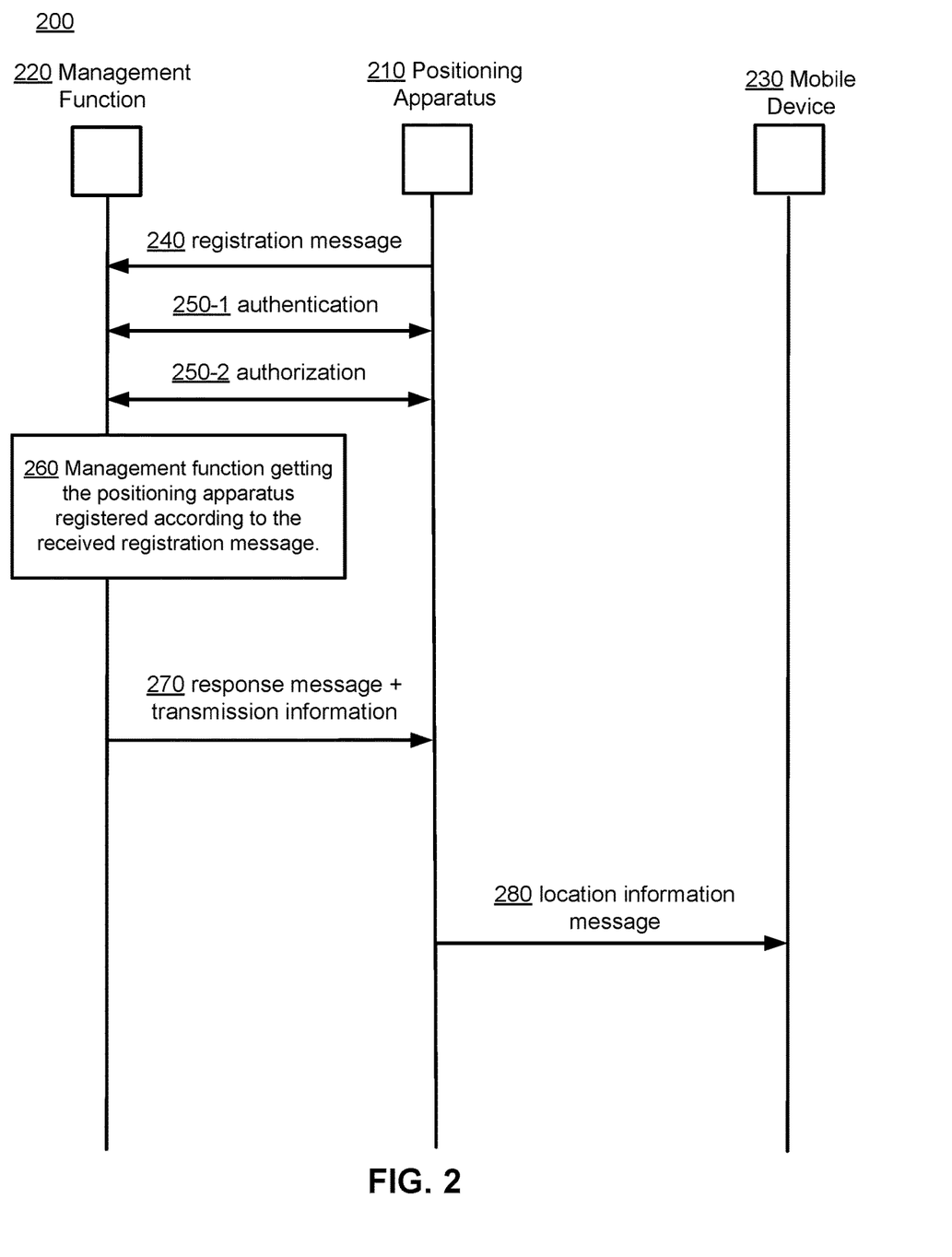
FIG. 2 depicts a method used by the system depicted in FIG. 1, according to an embodiment of the present invention.

Referring now to FIG. 2, in another embodiment of the invention, a method 200 is provided for supporting determining a location of a mobile device operatively coupled to a AN node. At step 240, the method 200 includes positioning apparatuses 210 sending management function 220 a registration message to register the positioning apparatuses and manage operation of the positioning apparatuses.

At step 260, the method 200 continues by having the management function 220 registering the positioning apparatus according to the received registration message. This registration by the management function can include authenticating and authorizing the positioning apparatuses, assigning or obtaining resources to be used by the positioning apparatuses for transmissions, registering locations of the positioning apparatuses, etc.

At step 270, the method 200 includes, management function 220 sending a response message including information associated with a transmission of the location information message to positioning apparatus 210. The information can include resources to use to transmit the location information message, an instruction for the positioning apparatus to select its own resources, security key information, etc.

At step 280, the method 200 includes the positioning apparatus 210 transmitting the location information message to the mobile device 230 according to the information included in the response message. The transmission can be repeated, for example periodically. Transmission of the location information message by positioning apparatus 210 can include transmitting a location information message that can contain an indication of the geographic location of said positioning apparatus on a specific resource. This specific resource can be a resource included in the available resources indicated in the response message. These available resources can be a pool of resources from which the positioning apparatus can select the specific resource that can be used for transmission of the location information. Also, information can be included in this response message that can indicate that said positioning apparatus can select the specific resource from the pool of resources.

Figure 3:
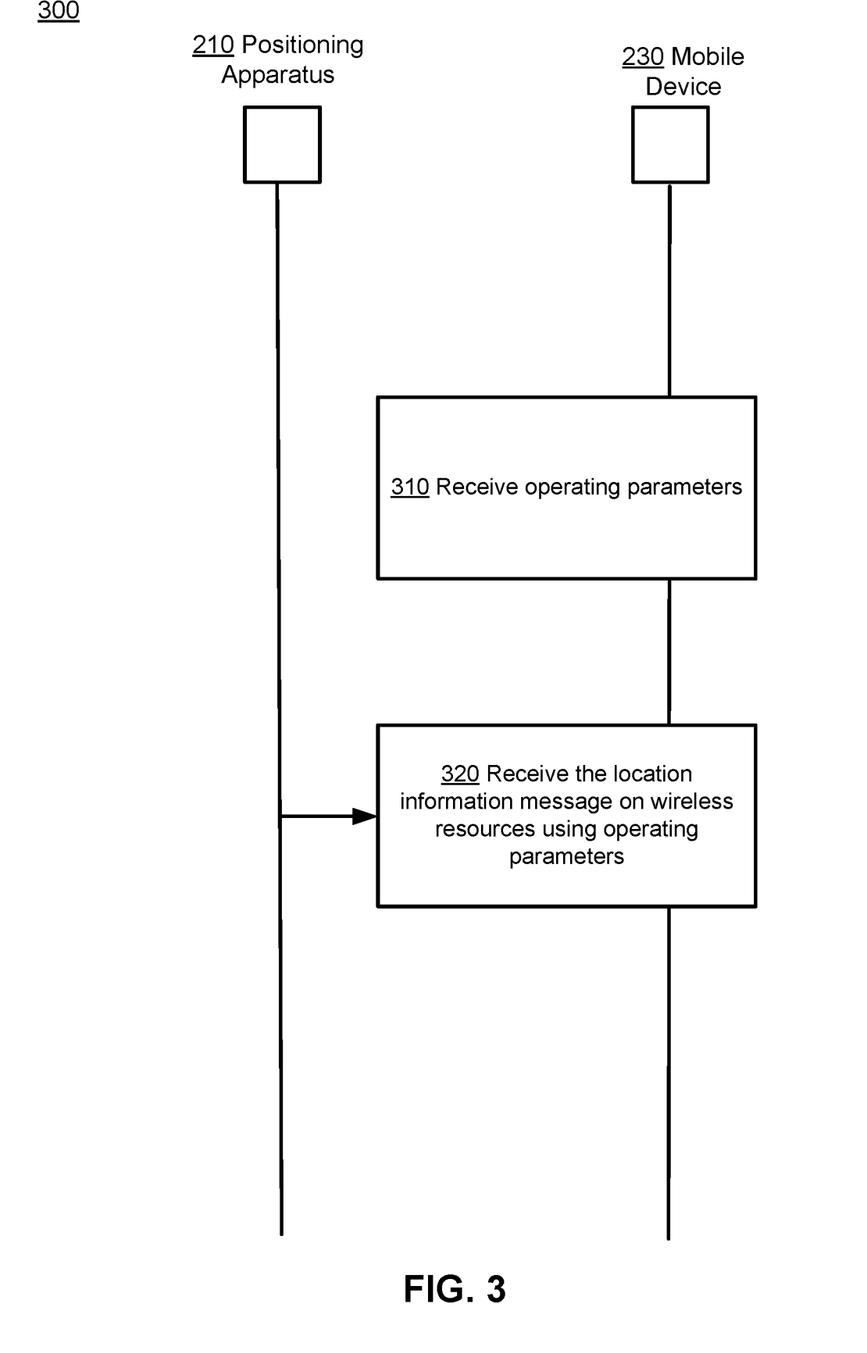
FIG. 3 depicts another method, according to an embodiment of the present invention.

Referring now to FIG. 3, in another embodiment of the invention, a method 300 is provided for facilitating location determination of a mobile device operatively coupled to a wireless network. At step 310 the method 300 includes obtaining, for example via wireless network, operating parameters of the positioning apparatus 210. These operating parameters may also be obtained from management function 220 or access network node 520 because both maintain a library of the same operating parameters as positioning apparatus 210. These operating parameters include wireless resources used by the positioning apparatus to transmit location information containing an indication of geographic location of the positioning apparatus 210. The method can include receiving a location information message using these wireless resources. The method can also include determining the location of the mobile device based at least in part on content of the location information message. This method can also include transmitting a registration message to a management function or to a management entity of the wireless network. The method can also include receiving, in response to the registration message, an indication of the operating parameters of the positioning apparatus. The method can also include monitoring these wireless resources following receipt of the operating parameters. A technical effect of such embodiments is that a location service can be obtained upon request and registration, and a management entity facilitates the registration process.

According to embodiments of the present invention, there is provided a method in which a positioning apparatus transmits a location information message containing an indication of a geographic location of the positioning apparatus. The method can further include interacting, via the communication interface, with a management function to register the positioning apparatus to a system and to manage operation of the positioning apparatus. This method also includes transmitting signals usable by at least one mobile device to determine the location of the mobile device based on physical layer parameters of the signals. A technical effect is that positioning apparatuses are registered to a system and the registration is managed. This assists in deployment and reconfiguration of the system.

At step 320, the method 300 includes mobile device 230 receiving the location information message on the wireless resources, for example as indicated in the obtained operating parameters.

Figure 4:
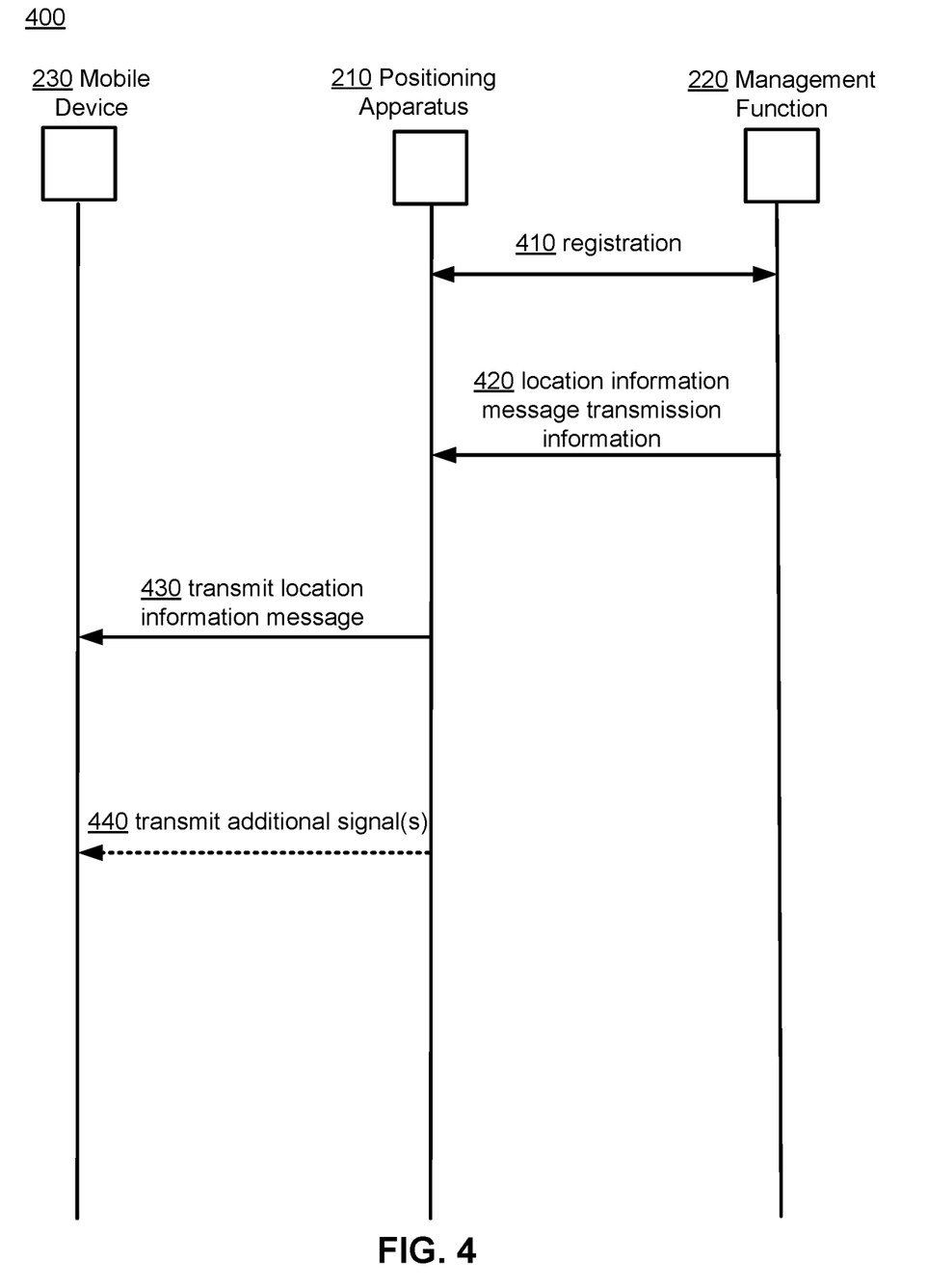
FIG. 4 depicts another method, according to an embodiment of the present invention.

Referring now to FIG. 4, in another embodiment of the invention, a method 400 is provided for configuring a positioning apparatus facilitating location determination of a mobile device operatively coupled to a wireless network.

At step 410, the method 400 includes positioning apparatus 210 registering, via the communication interface, to a management function 220 which is responsible for management of the location service. The registering can include transmitting an identifier of the positioning apparatus and a request to operate as part of a particular location service. An identifier of the location service may also be indicated by the positioning apparatus. The registration can involve multiple messages in a bi-directional registration operation. Registering to the management function may include performing a successful authentication and authorization operation with the management function.

At step 420, the method 400 includes the positioning apparatus receiving information regarding how it is to transmit indications of its geographic location after the registration. This information may be received via the communication interface. The indications can be included in location information messages. The indications of geographic location can be transmitted for example periodically. The information can include for example resources assigned for use by the positioning apparatus in transmitting the indications of geographic location. In this case the positioning apparatus can be configured to transmit the location indication on the assigned resource. The information can include available resources for a transmission of the indication of geographic location, and the positioning apparatus is further configured to select a resource from the available resources and transmit the indication of geographic location on the selected resource. The information can include security information, such as a security key to be used for encrypting or otherwise securing the location information messages. The positioning apparatus is configured in this case to transmit the indication of geographic location encrypted with the security key.

At step 430, the method 400 includes transmitting the indication of geographic location (e.g. location information message), for example repeatedly. The transmission is performed according to the information received in step 420. The transmissions may be received by mobile device 230, which may be configured in a separate procedure to monitor for such transmissions.

At optional step 440, the method includes transmitting additional signals, for example additional signals usable by mobile devices to determine their location, based on physical parameters of the additional signals. Alternatively, the mobile devices can determine their location based on physical parameters of the location information messages themselves. The additional signals may be received by mobile device 230, which may be configured in a separate procedure to monitor for such additional signals.

Figure 5:
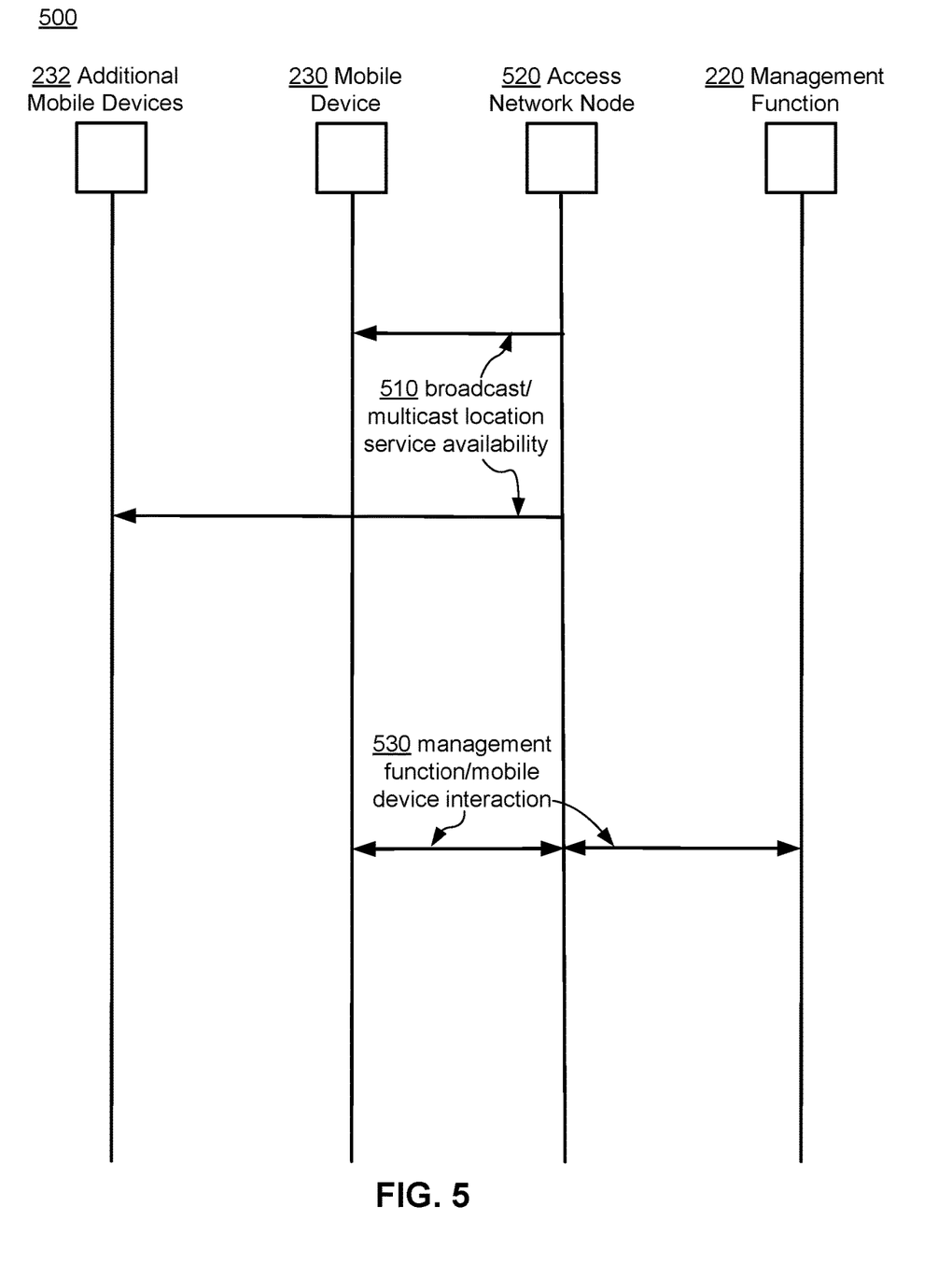
FIG. 5 depicts another method, according to an embodiment of the present invention.

Referring now to FIG. 5, in another embodiment of the invention, a method 500 is provided where at step 510 access network node 520 broadcast or multicast, via the wireless communication interface, an indication of availability of a location service provided using at least one positioning apparatus 210. This positioning apparatus may be separate from the access node. The broadcast or multicast may be to multiple mobile devices, including the mobile device 230 and additional mobile devices 232. The location service may be associated with at least one positioning apparatus, a management function responsible for providing the location service, or a combination thereof. This method also includes mediating interaction between a management function of the location service and a mobile device subscribing to the location service where this interaction includes informing the mobile device of operating parameters of the location service. A technical effect is that a wireless network can mediate interaction between mobile devices and the location service elements. Another technical effect is that the location service can be advertised and accessed through an existing wireless network.

In some embodiments, the method 500 further involves mediating an interaction 530 between a management function 220 of the location service and the mobile device 230 subscribing to the location service. The mediating of the interaction may involve the access network node 520 relaying messages between the management function 220 and the mobile device 230. Such relaying may be performed either without the network node opening or modifying the messages, or with the network node opening or modifying the messages. The interaction may include transmitting a registration request from the mobile device to the management function. The interaction may include informing the mobile device of information associated with how to receive the location service. The information associated with how to receive the location service may include resources used for transmission of the location information message. The information associated with how to receive the location service may include one or more security keys for decrypting the location information message.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Figure 6:
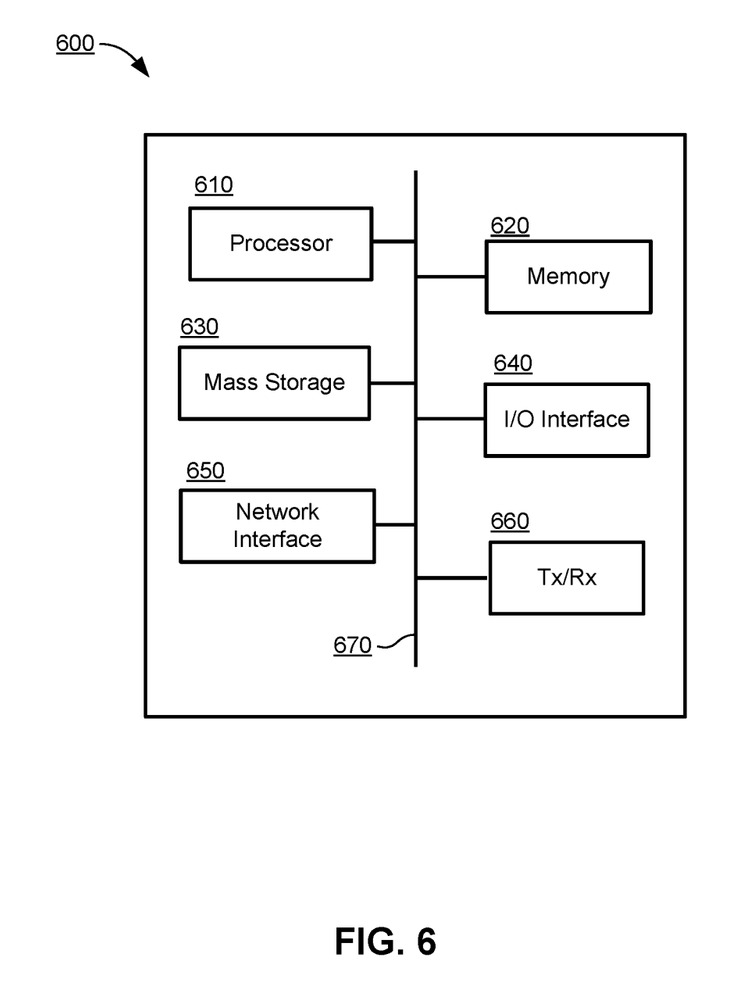
FIG. 6 illustrates, in a schematic diagram, an electronic device in accordance with embodiments of the present invention.

FIG. 6 is a schematic diagram of an electronic device 600 that may perform any or all of operations of the above methods and features explicitly or implicitly described herein, according to different embodiments of the present invention. For example, a computer equipped with network function may be configured as electronic device 600.

As shown, the device includes a processor 610, such as a Central Processing Unit (CPU) or specialized processors such as a Graphics Processing Unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

Accordingly in an embodiment of the present invention, there is provided a mobile device comprising a processor 610, a memory 620 and a wireless communication interface 660. The mobile device is configured to obtain, via the wireless network, operating parameters of at least one positioning apparatus. The operating parameters include wireless resources used by the positioning apparatus to transmit a location information message containing an indication of the geographic location of this positioning apparatus and receive the location information message on the wireless resources. These resources may be indicated to the mobile device by the management function or the AN node. The mobile device also configured to determine a location of the mobile device based on at least in part on content of the location information message. This mobile device is further configured to transmit a registration message to a management function or to a management entity of the wireless network. This mobile device also receives, in response to the registration message, an indication of the operating parameters of the positioning apparatus. This mobile device also monitors the wireless resources following receipt of the operation parameters. The mobile device is further configured to receive an indication of availability of a location service associated with one or more of: the management function or the at least one positioning apparatus; and according to the indication send the registration request. A technical effect is that a mobile device can access the location service through registration, and obtain operating parameters for such access after it is deployed, i.e. on demand. Another technical effect is that the mobile device registers to the service so that access to the service can be controlled.

The operating parameters can further include information such as security information for decrypting location information messages, indications of when and in what region the operating parameters are valid, etc.

According to an embodiment of the present invention, there is provided an access network (AN) node of a wireless network. The AN is comprised of a processor 610, a memory 620, and a wireless communication interface 660 configured to broadcast or multicast, using the wireless communication interface 660, to multiple mobile devices, an indication of availability of a location service associated with one or more of at least one positioning apparatus that is separate from the AN node provided using the location service, at least one positioning apparatus and a management function responsible for providing the location service. The AN node can be used to broadcast or multicast a message indicating that the location service is available, thus advertising service availability to mobile devices. A technical effect is that existing wireless network infrastructure can be used to advertise a location service.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

Figure 7:
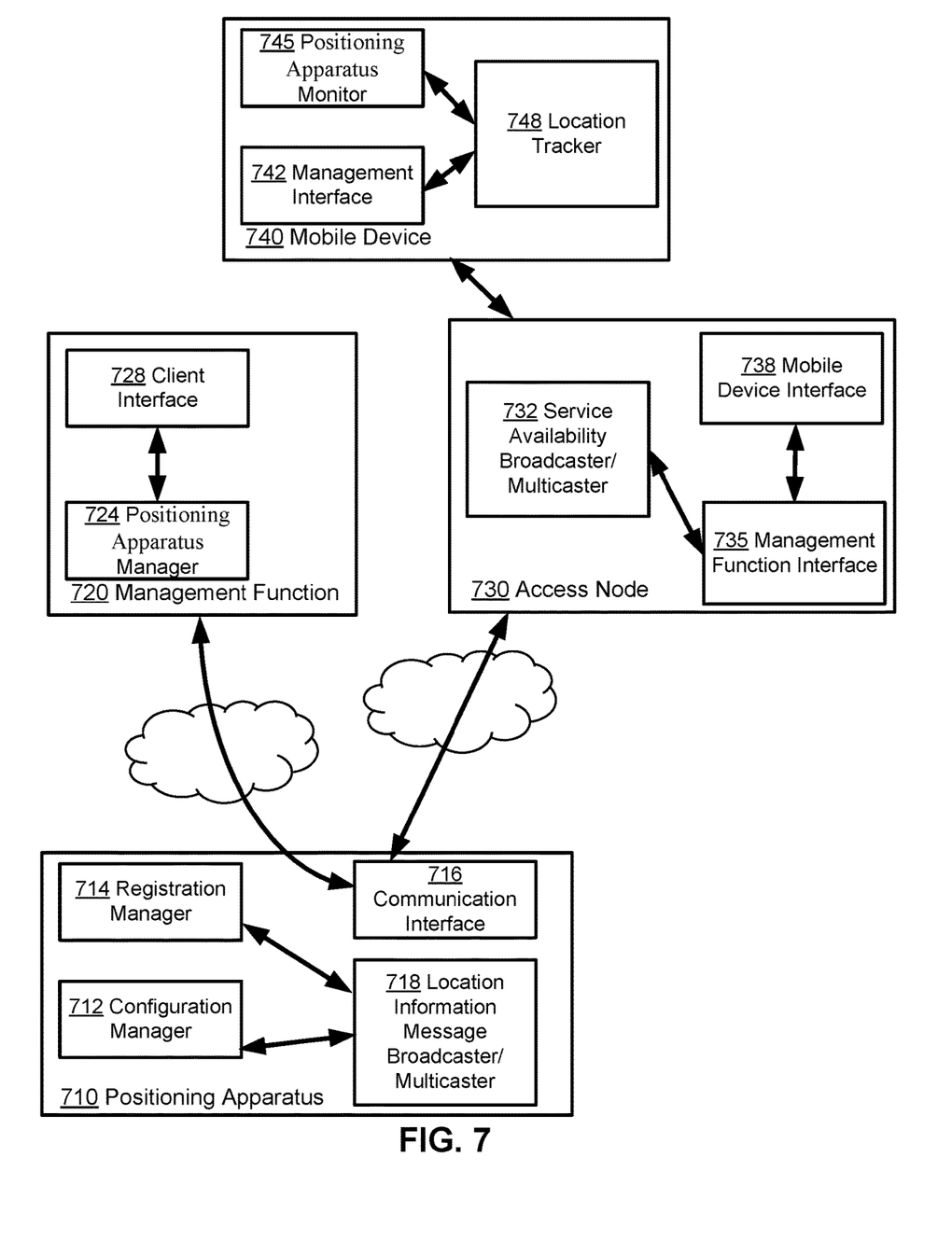
FIG. 7 illustrates a system and multiple apparatuses provided in accordance with embodiments of the present invention.

FIG. 7 is a diagram illustrating a system including positioning apparatus 710, management function 720, access node 730, and mobile device 740.

Positioning apparatus 710 receives management information from management function 720 to manage the operation of positioning apparatus 710. Positioning apparatus 710 also transmits position information to both management function 720 and mobile device 740. Positioning apparatus 710 includes configuration manager 712, registration manager 714, communication interface 716, and location information message broadcaster/multicaster 718. Location information message broadcaster/multicaster 718 communicates with configuration manager 712 in order to configure location information message broadcaster/multicaster 718. Location information message broadcaster/multicaster 718 communicates with registration manager 714 to provide information required for registration. Positioning apparatus 710 uses communication interface 716 to communicate with management function 720 and mobile device 740.

Management function 720 receives information from positioning apparatus 710 used to register this positioning apparatus in the system. Management function 720 also sends management information to positioning apparatus 710. Management function 720 includes positioning apparatus manager 724 and client interface 728. Positioning apparatus manager 724 transmits management information to client interface 728 and receives client information from client interface 728.

Access node 730 is utilized by controllers to operatively couple to positioning apparatus 710, and the mobile device 740 can register with and interact with a controller via the access node 730. Access node 730 mediates all messaging between mobile device 740 and positioning apparatus 710. Access node 730 also advertises service to mobile device 740. Therefore, access node 730 is closely integrated with positioning apparatus 710 and is used to manage operation of a location service for mobile device 740. Access node 730 includes service availability broadcaster/multicaster 732, management function 735, and mobile device interface 738. Management function interface 735 communicates with service availability broadcaster/multicaster 732 to indicate broadcast and multicast operation. Management function interface 735 communicates with mobile device interface 738 to manage mobile device 740.

Mobile device 740 includes a positioning apparatus monitor 745, management interface 742, and location tracker 748. Location tracker 748 transmits and receives information to and from both positioning apparatus monitor 745 and management interface 742. Positioning apparatus monitor 745 receives location information from positioning apparatus 710 and passes this location information to location tracker 748. Location tracker 748 then uses this location information to determine the geographic location of mobile device 740 using various techniques, for example triangulation, trilateration, multilateration, time-of-arrival processing, time-difference-of-arrival processing, angle-of-arrival processing, etc. It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology. A technical effect is that a mobile device can transmit and receive information to and from a management interface and also positioning apparatus. This information can be used to determine the mobile device's geographic location.

Embodiments of the present invention involve transmitting location information messages from a transmission point of a wireless network. This transmission point may be integrated or co-located with a wireless network node also performing other communication functions. Further details of this approach can be found in U.S. Patent Application No. 62/971,102, which is incorporated herein by reference.

Accordingly, in some embodiments, a respective location information message may be transmitted from each one of one or more transmission points of the wireless network. Each respective location information message contains an indication of geographic location of said one of the one or more transmission points. The mobile device may receive the location information message(s). The mobile device may then determine its location based at least in part on content of the location information message(s).

In some embodiments, a transmission point of the wireless network transmits a location information message. The location information message includes an identifier of the transmission point; and an indication of geographic location of the transmission point.

The location information message in such embodiments may be a dedicated broadcast message transmitted via a respective broadcast transport channel shared between the transmission points. The location information message may be transmitted in a respective SIB. Similar to previous discussions herein, the location of the mobile device may be determined based on physical layer parameters of signals received from the one or more transmission points.

In some embodiments, the location information message is transmitted over a respective dedicated logical channel and a respective dedicated physical channel associated with the dedicated logical channel. In some embodiments, the location information message occupies a portion of wireless resources assigned to the physical channel.

In some embodiments, location information messages from different transmission points (or positioning apparatuses) which are located within a predetermined area occupy different portions of the wireless resources, and wherein location information messages from different transmission points which are not located within a predetermined area occupy a same portion of the wireless resources.

In some embodiments, a plurality of positioning apparatuses are provided, and location information messages from different positioning apparatuses (which can be located within a predetermined area) can use different portions of a pool of wireless resources. Furthermore, location information messages from different positioning apparatuses which are not located within a predetermined area occupy a same portion of the pool of wireless resources. This facilitates spatial resource reuse. A management function can be configured to assign at least some of the plurality of positioning apparatuses with respective portions of the wireless resources, or at least some of the positioning apparatuses autonomously determine their respective portions of the wireless resources, or a combination thereof. A technical effect is that resources are re-used, which can simplify mobile device operation such as signal searching. Another technical effect is that resources can be assigned in a centralized or decentralized manner, which can assist in system configuration.

In some embodiments, the mobile device may transmit a registration message to a control function communicable with at least one of the transmission points or one of the transmission point. Following receipt of the registration message, the control function or the one of the transmission points may transmit resource information to the mobile device. The resource information indicates communication resources used by the one or more transmission points to transmit the location information messages. Following receipt of the resource information, the mobile device monitors the indicated communication resources for the location information message. Different sets of communication resource may be assigned to different transmission points. Furthermore, the location information messages may be encrypted, and the resource information may include security information to be used by the mobile device for decrypting the location information messages.

In some embodiments, the location information message includes an identifier of the transmission point which is transmitting the message.

In some embodiments, the indication of geographic location is one of: an absolute geographic location comprising latitude, longitude and height information; and a geographic location relative to a predetermined reference location and comprising a three-dimensional location offset from said reference location.

In some embodiments, the location information message includes a plurality of records. Each record includes an identifier of a different respective one of the one or more transmission points and an indication of physical location of said different respective one of the one or more transmission points.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system comprising:
at least one positioning apparatus, each positioning apparatus configured to register to a management function by sending a registration message to the management function, and transmit a location information message containing an indication of geographic location of said positioning apparatus on a specific resource to a mobile device, the location information message used by the mobile device to determine location of the mobile device; and
the management function configured to:
register the at least one positioning apparatus according to the received registration message and send a response message including information associated with a transmission of the location information message to the at least one positioning apparatus, wherein the information associated with the transmission of the location information message indicates a resource pool from which the positioning apparatus is to select the specific resource, and wherein either: the management function is further configured to receive an indication of the specific resource from the positioning apparatus; or the information associated with the transmission of the location information message indicates the specific resource;
receive a request from the mobile device for a registration to a location service, the location service associated with the management function and the at least one positioning apparatus; and
following the request, inform the mobile device of information indicating how to receive the location information message.

2. The system of claim 1, wherein the management function is further configured to authenticate and authorize the at least one positioning apparatus as part of said registration.

3. The system of claim 1, further comprising an access network (AN) node configured to broadcast or multicast, to mobile devices including the mobile device, an indication of availability of the location service.

4. The system of claim 1, wherein the information indicating how to receive the location information message includes one or both of: a resource pool of wireless resources on which the location information message can be broadcast from the at least one positioning apparatus; and at least one: of a region in which the location information message is permitted to be transmitted on the indicated resource; and a time interval during which the location information message is permitted to be transmitted on the indicated resource.

5. The system of claim 1, wherein the geographic location of the at least one positioning apparatus is a relative location or an absolute geographic location.

6. The system of claim 1, wherein at least one resource from a pool of wireless resources is re-used by different members of a plurality of positioning apparatuses including the at least one positioning apparatus, said different members being spaced apart sufficiently that mutual interference due to said re-use is below a level required for reliable reception of respective location information messages transmitted by each of the different members.

7. A positioning apparatus comprising a processor, a memory and a communication interface, the positioning apparatus configured to:
register, via the communication interface, to a management function responsible for management of a location service, by sending a registration message to the management function;
receive, via the communication interface, information on how to transmit indication of geographic location of said positioning apparatus after the registration; and
transmit a location information message containing the indication of geographic location of said positioning apparatus on a specific resource to a mobile device, the location information message used for the mobile device to determine location of the mobile device.

8. The positioning apparatus of claim 7, wherein the received information includes:
   a resource assigned for a transmission of the indication, and the positioning apparatus is further configured to transmit the location information message on the resource; or
   available resources for the transmission of the indication, and the positioning apparatus is further configured to select a resource from the available resources and transmit the indication on the selected resource.

9. The positioning apparatus of claim 7, wherein registering to the management function comprises performing a successful authentication and authorization operation with the management function.

10. The positioning apparatus claim 7, wherein the geographic location of said positioning apparatus is a relative location or an absolute geographic location.

11. The positioning apparatus of claim 10, wherein the location information message indicates whether the geographic location is a relative location or an absolute geographic location.

12. The positioning apparatus of claim 7, wherein the received information further includes a security key for encrypting the location information message, and the positioning apparatus is configured to transmit the location information message encrypted with the security key.

13. A method comprising:
   by at least one positioning apparatus, registering to a management function by sending a registration message to the management function;
   by the at least one positioning apparatus, transmitting a location information message containing an indication of geographic location of said positioning apparatus on a specific resource to a mobile device, the location information message used by the mobile device to determine location of the mobile device;
   by the management function, registering the at least one positioning apparatus according to the received registration message;
   by the management function, sending a response message including information associated with a transmission of the location information message to the at least one positioning apparatus, wherein the information associated with the transmission of the location information message indicates a resource pool from which the positioning apparatus is to select the specific resource, and wherein either: the management function is further configured to receive an indication of the specific resource from the positioning apparatus; or the information associated with the transmission of the location information message indicates the specific resource;
   by the management function, receiving a request from the mobile device for a registration to a location service, the location service associated with the management function and the at least one positioning apparatus; and
   by the management function, following the request, informing the mobile device of information indicating how to receive the location information message.

14. The method according to claim 13, further comprising, by the at least one positioning apparatus, transmitting the location information message containing the indication of geographic location of said positioning apparatus on a specific resource according to the available resource indicated in the response message, said available resource indicated in the response message is a resource pool from which the positioning apparatus is to select the specific resource for transmission of the location information, and the information included in the response message further indicates that the at least one positioning apparatus is to make the selection.

15. The method according to claim 13, further comprising, by the management function, authenticating and authorizing the at least one positioning apparatus as part of registration of said positioning apparatus.

16. The method according to claim 13, the resource pool is pool of wireless resources which are usable by positioning apparatus in a given area, or during a given time interval, or a combination thereof.

17. The method according to claim 13, wherein the registration message includes a request to operate as a part of the location service.

* * * * *